(12) United States Patent
Ranade et al.

(10) Patent No.: US 12,548,233 B2
(45) Date of Patent: Feb. 10, 2026

(54) 3D TEXTURING VIA A RENDERING LOSS

(71) Applicant: Samsung Electronics Co., Ltd., Gyeonggi-do (KR)

(72) Inventors: Rohit R Ranade, San Diego, CA (US); Yangwen Liang, San Diego, CA (US); Shuangquan Wang, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 260 days.

(21) Appl. No.: 17/166,586

(22) Filed: Feb. 3, 2021

(65) Prior Publication Data

US 2022/0122311 A1   Apr. 21, 2022

Related U.S. Application Data

(60) Provisional application No. 63/094,661, filed on Oct. 21, 2020.

(51) Int. Cl.
*G06T 15/04* (2011.01)
*G06N 3/04* (2023.01)
(Continued)

(52) U.S. Cl.
CPC ............ *G06T 15/04* (2013.01); *G06N 3/04* (2013.01); *G06N 3/08* (2013.01); *G06T 3/4046* (2013.01); *G06T 3/4053* (2013.01); *G06T 17/20* (2013.01)

(58) Field of Classification Search
None
See application file for complete search history.

(56) References Cited

U.S. PATENT DOCUMENTS

2017/0278293 A1* 9/2017 Hsu ................... G06T 15/04
2018/0075581 A1   3/2018 Shi et al.
(Continued)

FOREIGN PATENT DOCUMENTS

CN   111598762 A * 8/2020 ........... G06N 3/0454
GB   2576548 A * 2/2020 ........... G06T 15/205
(Continued)

OTHER PUBLICATIONS

Yawei Li et al., "3D Appearance Super-Resolution with Deep Learning", Proceedings of the IEEE/CVF Conference on Computer Vision and Pattern Recognition, 2019, 10 pages.
(Continued)

*Primary Examiner* — Aaron M Richer
(74) *Attorney, Agent, or Firm* — The Farrell Law Firm, P.C.

(57) ABSTRACT

An electronic device and method for texturing a three dimensional (3D) model are provided. The method includes rendering a texture atlas to obtain a first set of two dimensional (2D) images of the 3D model; rendering a ground truth texture atlas to obtain a second set of 2D images of the 3D model; comparing the first set of images with the second set of images to determine a rendering loss; applying the texture sampling properties to a convolutional neural network (CNN) to incorporate the rendering loss into a deep learning framework; and inputting a 2D texture atlas into the CNN to generate a texture of the 3D module.

12 Claims, 7 Drawing Sheets

(51) Int. Cl.
*G06N 3/08* (2023.01)
*G06T 3/4046* (2024.01)
*G06T 3/4053* (2024.01)
*G06T 17/20* (2006.01)

(56) References Cited

U.S. PATENT DOCUMENTS

| | | | | |
|---|---|---|---|---|
| 2019/0147642 | A1* | 5/2019 | Cole | G06V 10/82 |
| | | | | 345/419 |
| 2019/0378242 | A1* | 12/2019 | Zhang | G06K 9/6201 |
| 2020/0098137 | A1* | 3/2020 | Hemmer | G06T 9/004 |
| 2020/0160546 | A1 | 5/2020 | Gu et al. | |
| 2020/0160593 | A1 | 5/2020 | Gu et al. | |
| 2021/0304418 | A1* | 9/2021 | Soon-Shiong | G06F 16/70 |
| 2021/0358197 | A1* | 11/2021 | Shysheya | G06T 17/10 |
| 2021/0375010 | A1* | 12/2021 | Soons | G06T 3/4046 |
| 2022/0014723 | A1* | 1/2022 | Pandey | G06V 10/462 |
| 2022/0345756 | A1* | 10/2022 | Kroon | H04N 21/2365 |

FOREIGN PATENT DOCUMENTS

| | | | | |
|---|---|---|---|---|
| TW | 201631963 | | 9/2016 | |
| WO | WO-2020096403 A1 | * | 5/2020 | G06N 3/006 |
| WO | WO 2020/117657 | | 6/2020 | |

OTHER PUBLICATIONS

Taiwanese Office Action dated Feb. 26, 2025 issued in counterpart application No. 110138782, 8 pages.

* cited by examiner

3D TEXTURING VIA A RENDERING LOSS

PRIORITY

This application is based on and claims priority under 35 U.S.C. § 119(e) to U.S. Provisional Patent Application Ser. No. 63/094,661, filed on Oct. 21, 2020 in the United States Patent and Trademark Office, the entire contents of which is incorporated herein by reference.

FIELD

The present disclosure generally relates to three dimensional (3D) reconstruction texture mapping of images.

BACKGROUND

In 3D reconstruction texture mapping, texture for a 3D model is derived from input images. In this process, patches representing two dimensional (2D) pieces of the 3D model are extracted from the input images and packed into larger images called texture atlases. An advantage of texture atlases is that they may be used for many different resolutions.

During rendering of the 3D model, the renderer projects texture from the texture atlases on to the image plane at a particular camera location. Since texture is derived directly from the input images, the quality or resolution of the input images have an impact on the final rendering quality of the 3D model. The resolution of the input images also affects the memory or computations involved during the 3D reconstruction process. Therefore, most current mobile phone 3D reconstruction apps utilize images at video graphics array (VGA) resolution (640 pixels by 480 pixels). In such a scenario, applying super-resolution processing can enhance the quality of the rendered 3D model.

Super-resolution processing refers to the process of recovering high-resolution images from low-resolution images. Super-resolution processing techniques can be applied to a two dimensional (2D) texture map of a 3D object to retrieve a detailed appearance of the object, such as characteristics of its surface, so it may be applied to a reconstructed 3D object to increase its realism.

Unfortunately, super-resolution processing techniques for 2D images may not be applicable to super-resolution processing for 3D images. This may be due to the process of 3D reconstruction where only sequences of unaligned image captures are available for reconstruction.

Accordingly, in order to improve super-resolution texture mapping of 3D models, a new 3D texturing technique may be necessary to avoid inefficiencies caused by reliance on 2D super-resolution processing techniques.

SUMMARY

According to one embodiment, a method for texturing a 3D model is provided. The method includes rendering a texture atlas to obtain a first set of 2D images of the 3D model; rendering a ground truth texture atlas to obtain a second set of 2D images of the 3D model; comparing the first set of images with the second set of images to determine a rendering loss; applying the texture sampling properties to a convolutional neural network (CNN) to incorporate the rendering loss into a deep learning framework; and inputting a 2D texture atlas into the CNN to generate a texture of the 3D model.

According to one embodiment, an electronic device for texturing a 3D model is provided. The electronic device includes a non-transitory computer readable memory and a processor, wherein the processor is, upon executing instructions stored in the non-transitory computer readable memory, configured to render a texture atlas to obtain a first set of 2D images of the 3D model; render a ground truth texture atlas to obtain a second set of 2D images of the 3D model; compare the first set of images with the second set of images to determine a rendering loss; apply texture sampling properties to a CNN to incorporate the rendering loss into a deep learning framework; and input a 2D texture atlas into the CNN to generate a texture of the 3D model.

According to one embodiment, a method for texturing a 3D model is provided. The method includes rendering a ground truth texture atlas to obtain a first set of 2D images of the 3D model; down sampling the set of 2D images of the 3D model to obtain a second set of low resolution 2D images of the 3D model; and texturing a geometric mesh of the 3D model to obtain a low resolution texture atlas.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

"Rendering loss" may be defined as a process of obtaining 2D image characteristic loss information by comparing rendered images of a 3D model to a ground truth 3D model for 3D texture (i.e. texture atlas) manipulation. A "3D ground truth model" may be defined as a model of a 3D object having a higher resolution than that of the 3D model.

A set of parameters may be adjusted based on prior results (i.e., a training pipeline) to account for a rendering loss in a 2D imaging supervised deep learning framework and, more specifically, for super-resolution processing. The deep learning framework may be implemented by using a convolutional neural network (CNN). Alternatively, a generative adversarial network (GAN) with varying architecture and/or a different loss function may be used.

The rendering loss process may compare rendered images of the 3D model with those from the ground truth 3D model for a supervised deep learning scenario. This allows the CNN to apply the texture sampling used during the rendering of a 3D model.

The training pipeline may use differentiable rendering to incorporate the rendering loss into a deep learning framework and manipulate the texture of a 3D model based on the rendering loss to apply super-resolution processing to a 3D texture. During inference, renderings of the 3D model are not required and the trained model may function as a regular 2D image CNN model. This also allows the CNN to apply the texture sampling used during the rendering of the 3D model.

Accounting for the rendering loss may be extended to other 3D texture-related tasks besides super-resolution processing, such as filling texture for missing faces and other CNN architectures, cross reality (XR) processes, augmented reality processes, virtual reality processes, video game processes, movie production processes, and digital culture heritage preservation processes.

For example, a 3D model, including a low resolution texture and a mesh, may be sent to a user's personal computer (PC) through the internet for online gaming. The user's personal computer may perform super-resolution on the low resolution texture to obtain a high resolution texture that may be applied to the mesh to generate a high resolution 3D model for gaming. Thus, since the high resolution 3D model was generated on a local device instead of being transmitted, bandwidth for communicating over the Internet may be preserved and latency may be reduced.

Figure 1:
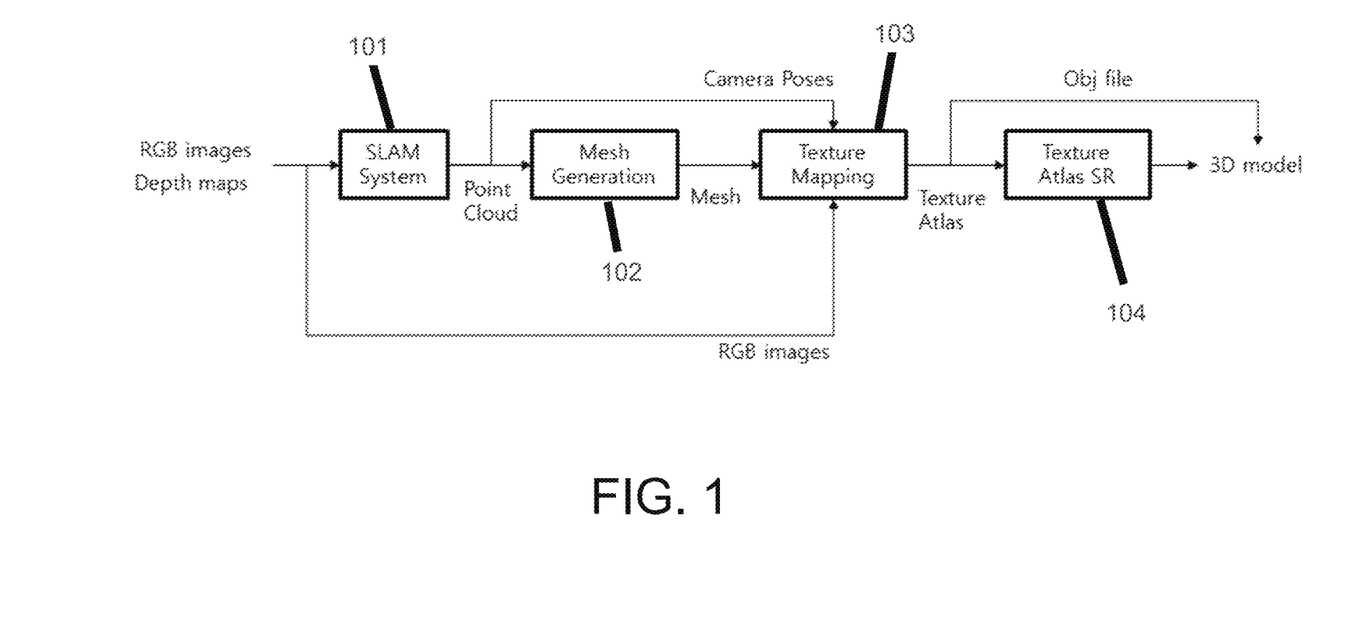
FIG. 1 illustrates a method for performing 3D super-resolution processing, according to one embodiment.

FIG. 1 illustrates a method for performing 3D super-resolution processing, according to one embodiment.

Referring to FIG. 1, red green blue (RGB) images and depth maps are input to the simultaneous localization and mapping (SLAM) system unit 101 to generate a set of views (i.e., a point cloud) for generating a 3D mesh of the 3D model. The RGB images are also input to the texture mapping unit 103.

The SLAM system unit 101 generates the point cloud, which is input to the mesh generation unit 102. In addition, the point cloud includes the set of views (i.e., camera poses) that are input to the texture mapping unit 103.

The mesh generation unit 102 outputs a mesh to the texture mapping unit 103. The mesh is a structural build of the 3D model, and may include reference points to define shapes with height, width and depth.

The texture mapping unit 103 generates a texture atlas based on the mesh, the set of views, and the RGB images. In addition, in order to take advantage of the flexibility of the resolution of texture atlases, during texture mapping, texture coordinates (x, y) for each vertex in the mesh (i.e., coordinates for each vertex inside the texture atlas 2D image) may be assigned in a coordinate system based on a ratio of image size (0<x<1, 0<y<1). This allows the texture unwrapping process during rendering to be independent of the actual size of the texture atlas, so that at a later time, a higher resolution or manipulated image may be re-used without the need to perform the texturing step again.

The texture atlas is input to the texture atlas super-resolution unit 104 to generate a 3D model. Additionally, an object file of the texture atlas may also be output with the 3D model.

Since texture unwrapping during rendering may be performed independent of the size of the texture atlas, a conventional 2D image processing task, such as super-resolution, may be incorporated into a 3D texturing process, and all previous steps in the process (i.e., point cloud registration, surface reconstruction, and/or texture mapping) may still be performed with input low resolution images while the generated object file (containing all the geometric information of the reconstructed 3D model) may be re-used with the super-resolved texture atlas to create a final 3D model. Thus, conventional 2D image processing algorithms may be efficiently applied for texturing a 3D model.

Super-resolution techniques may include, but are not limited to, statistical methods, patch-based methods, sparse representation methods, and prediction-based methods.

Figure 2:
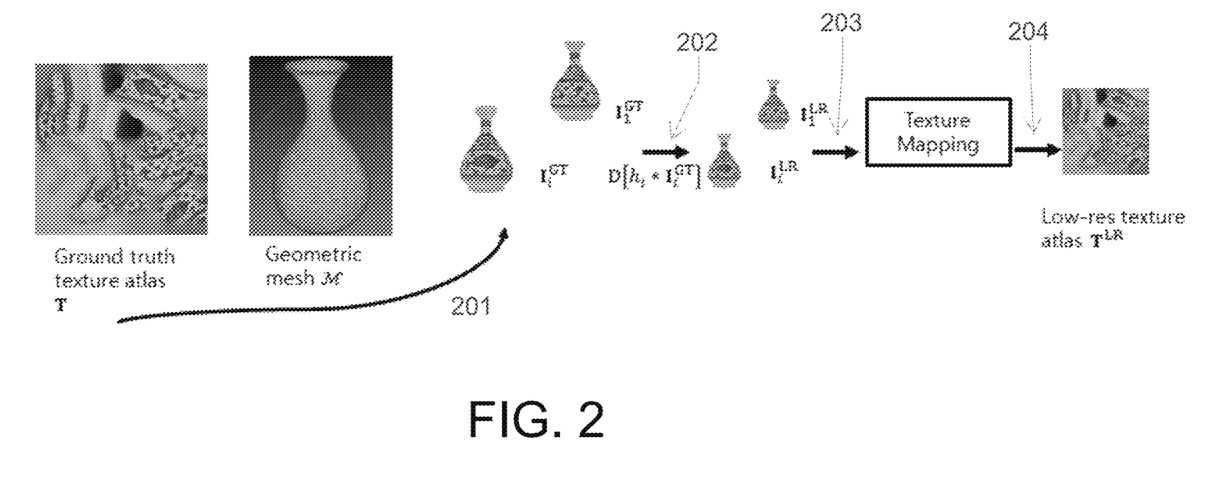
FIG. 2 illustrates a forward 3D texture formation model, according to one embodiment.

FIG. 2 illustrates a forward 3D texture formation model, according to one embodiment.

The forward 3D texture formation model outputs a low resolution texture atlas $T^{LR}$, which enables rendering of a 3D textured model at various views (i.e., camera poses or camera locations).

Referring to FIG. 2, a ground truth texture atlas T and a geometric mesh $\mathcal{M}$ are provided as input. In 201, texture maps from the ground truth texture atlas T are applied to various camera locations i, with known camera intrinsic and extrinsic properties, to form a 3D ground truth model that is made up of a collection of ground truth images $I_i^{GT}$. The geometric mesh $\mathcal{M}$ and texture T may be projected on to the image plane to obtain the ground truth images $I_i^{GT}$.

In 202, degraded low resolution images $I_i^{LR}$ are obtained from the ground truth images $I_i^{GT}$ using a simple degradation process of, for example, lens blur or down sampling. The low resolution images $I_i^{LR}$ may be defined according to Equation (1) below:

$$I_i^{LR} = D[h_i * I_i^{GT}] \qquad (1)$$

where $h_i$ is a Gaussian kernel, * is the convolutional operator and D[ ] is the down-sampling operator.

In 203, the low resolution images $I_i^{LR}$ are provided as input to a texture mapping unit. In 204, the low resolution images $I_i^{LR}$ are used to formulate a texture of the geometric mesh $\mathcal{M}$ (i.e., texture mapping) to assemble a low resolution texture atlas $T^{LR}$.

The geometric mesh $\mathcal{M}$ can now be rendered with the low resolution texture atlas $T^{LR}$ at any camera location i to obtain the low resolution images $I_i^{LR}$.

Figure 3:
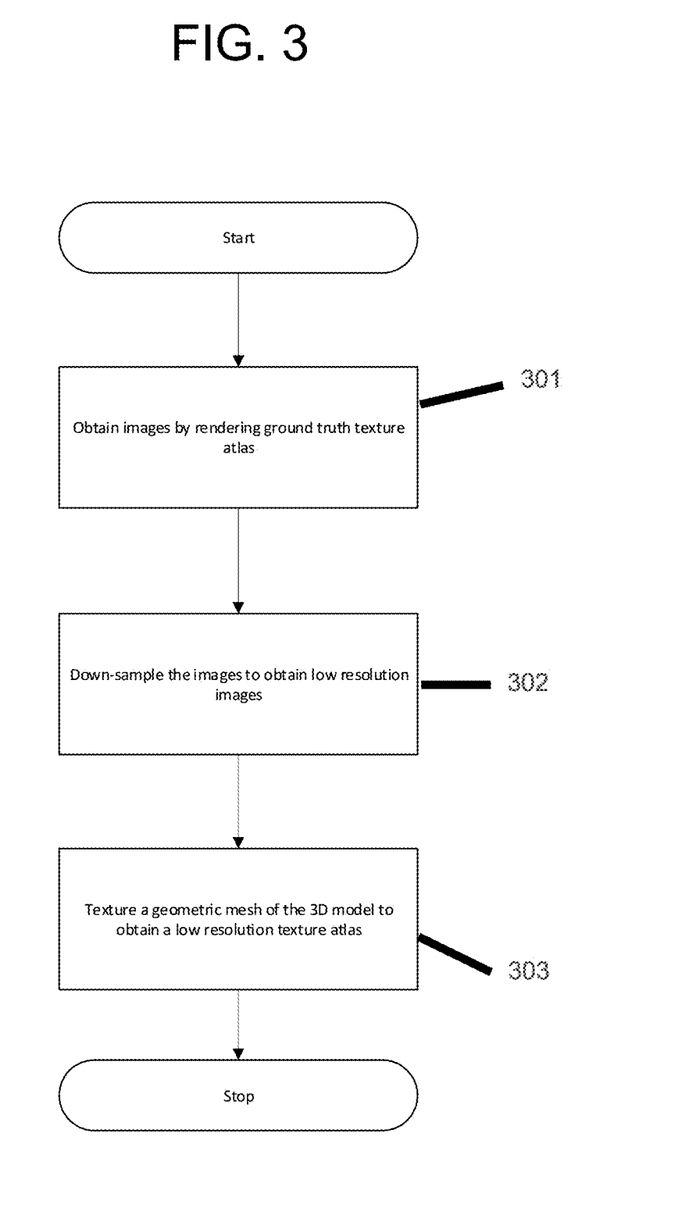
FIG. 3 is a flowchart illustrating a method for obtaining the low resolution texture atlas, according to one embodiment.

FIG. 3 is a flowchart illustrating a method for obtaining the low resolution texture atlas, according to one embodiment.

Referring to FIG. 3, at 301 the ground truth texture atlas T is rendered to obtain the ground truth images $I^{GT}$. At 302, the ground truth images $I^{GT}$ are down-sampled to obtain the low resolution images $I^{LR}$. At 303, the low resolution images $I^{LR}$ are applied to a mesh $\mathcal{M}$ of the 3D model to obtain the low resolution texture atlas $T^{LR}$.

As explained below, the obtained low resolution texture atlas $T^{LR}$ can be used to account for a rendering loss in a deep learning framework.

The geometric mesh $\mathcal{M}$ and the low resolution texture atlas $T^{LR}$ can be used to render low resolution images $I_i^{LR}$ at a camera location i. Therefore, the low resolution images $I_i^{LR}$ may also be expressed as shown in Equation (2) below:

$$I_i^{LR} = \pi_i^{LR}(\mathcal{M}, T^{LR}) \qquad (2)$$

The camera locations i of the low resolution images $I_i^{LR}$ may be selected in a spherical helix trajectory. Objective metrics (i.e., a peak signal to noise ratio (PSNR) and/or a structural similarity index measurement (SSIM)) of the ground truth images $I_i^{GT}$ and the low resolution images $I_i^{LR}$ may be used to calculate a rendering loss $\mathcal{L}_{rendering}$ rendering based on Equation (3) below:

$$\mathcal{L}_{rendering} = \rho(I_i^{GT}, I_i^{LR}) \qquad (3)$$

where $\rho(\ )$ can be any differentiable objective metric comparing the ground truth images $I_i^{Gt}$ and the low resolution images $I_i^{LR}$. Additionally, the objective metrics may be computed separately over a red channel, a green channel, and a blue channel of an RGB image.

Similarly, for N rendered images, a rendering loss $\mathcal{L}_{rendering}$ may be defined according to Equation (4) below:

$$\mathcal{L}_{rendering} = \frac{1}{N} \sum_{i=0}^{N-1} \rho(I_i^{GT}, I_i^{LR}) \qquad (4)$$

A rendering loss $\mathcal{L}_{rendering}$ may be accounted for in a 2D or 3D super-resolution task using a deep learning setting. For example, a CNN f( ) characterized by parameters θ accounts for the deep learning setting. The CNN f( ) may be presented with a low resolution texture atlas $T^{LR}$ to output a network output $\overline{T^{LR}}$ based on the parameters θ. The network output $\overline{T^{LR}}$ may be expressed by Equation (5) below:

$$\overline{T^{LR}} = f(\theta, T^{LR}) \qquad (5)$$

The network output $\overline{T^{LR}} = f(\theta, T^{LR})$ may be a texture atlas that accounts for the rendering loss $\mathcal{L}_{rendering}$ by applying the CNN with the parameters θ to the low resolution texture atlas $T^{LR}$. The network output $\overline{T^{LR}}$ may be compared with a corresponding high-resolution ground truth texture atlas T, and the loss $\mathcal{L}_{atlas}$ may be back-propagated through the network and the parameters θ may be updated according to an optimization scheme. The loss $\mathcal{L}_{atlas}$ may be expressed according to Equation (6) below:

$$\mathcal{L}_{atlas} = \rho(\overline{T^{LR}}, T) \qquad (6)$$

Figure 4A:
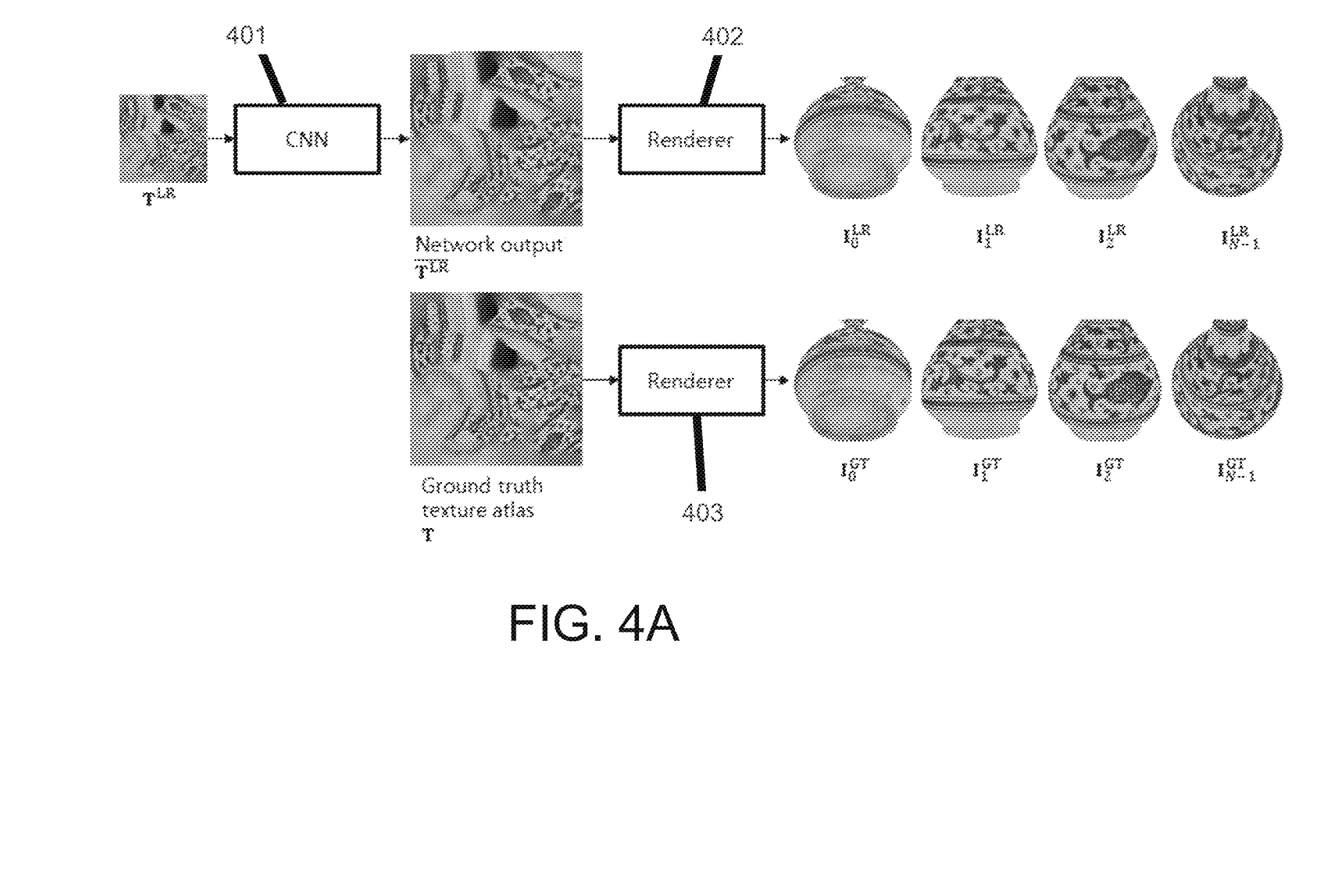
FIG. 4A illustrates a model for incorporating a rendering loss into a 2D supervised deep learning framework, according to one embodiment.

FIG. 4A illustrates a model for incorporating a rendering loss into a 2D supervised deep learning framework, according to one embodiment.

The proposed framework leverages the ability of a differentiable renderer to propagate gradients backward from rendered images to the different aspects of model information, allowing the renderings to be incorporated into deep learning processes.

A standard renderer may take 3D model information, e.g., geometry, textures, cameras, and lights, as inputs and outputs projected images on the image plane of the camera locations.

In the proposed framework, the differentiable renderer may relate the 2D loss from the pixels of the rendered image back to the properties of the 3D shape, such as the positions of mesh vertices.

Referring to FIG. 4A, a low resolution texture atlas $T^{LR}$ may be input to the CNN 401 to obtain the network output $\overline{T^{LR}}$. The network output $\overline{T^{LR}}$ may include of a low resolution texture atlas and may be input to a differentiable renderer 402 to render low resolution images $I_0^{LR}$, $I_1^{LR}$, $I_2^{LR}$, and $I_{N-1}^{LR}$ at N different camera locations. Similarly, a ground truth texture atlas T may be input to a differentiable renderer 403 to render ground truth images $I_0^{GT}$, $I_1^{GT}$, $I_2^{GT}$, and $I_{N-1}^{GT}$ at N different camera locations. $\mathcal{L}_{rendering}$ may then be calculated between the rendered pairs of images based on Equation (4), above, and back-propagated through the network via differentiable renderers 402 and 403.

The total loss $\mathcal{L}$ may be calculated based on Equation (7) below:

$$\mathcal{L}=\lambda \cdot \mathcal{L}_{atlas}+(1-\lambda)\cdot \mathcal{L}_{rendering} \quad (7)$$

where λ is a parameter for controlling the contribution of either $\mathcal{L}_{atlas}$ and $\mathcal{L}_{rendering}$.

Figure 4B:
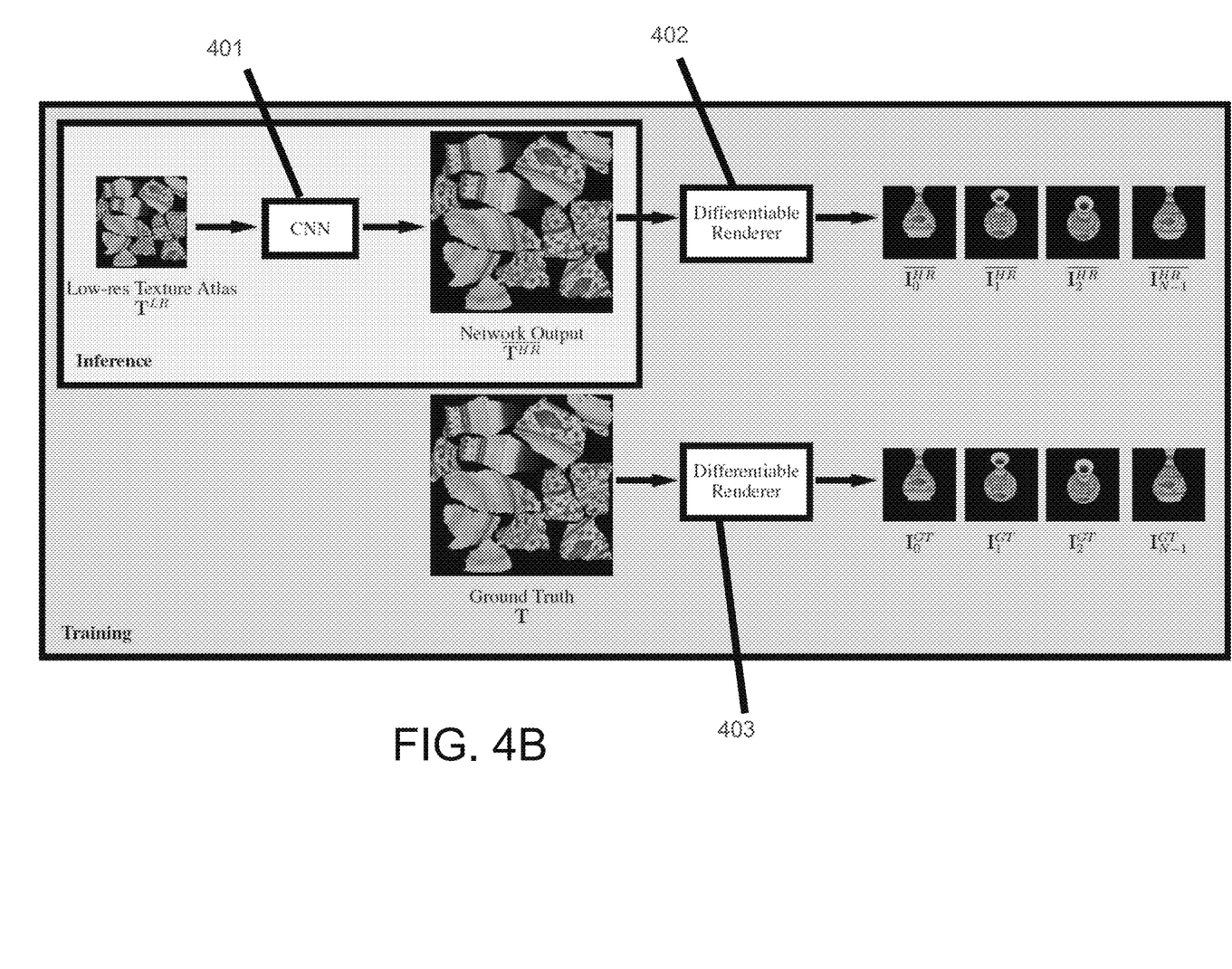
FIG. 4B illustrates a model for incorporating a rendering loss into a 2D supervised deep learning framework, according to one embodiment.

FIG. 4B illustrates a model for incorporating a rendering loss into a 2D supervised deep learning framework, according to one embodiment.

The model of FIG. 4B shares some similarities with FIG. 4A. Therefore, the descriptions of components that are consistent throughout both figures may not be repeated, for brevity.

Referring to FIG. 4B, the low resolution texture atlas $T^{LR}$ may first be passed through the CNN f(θ, . . . ) to obtain the network output $\overline{T^{HR}}$. The ground truth atlas T and $\overline{T^{HR}}$ may then be rendered using differentiable renderers 402 and 403 to render images $I_N^{GT}$ and $I_N^{HR}$ at N different camera locations. The network output $\overline{T^{HR}}$ may include of a high resolution texture atlas and may be input to a differentiable renderer 402 to render low resolution images $I_0^{HR}$, $I_1^{HR}$, $I_2^{HR}$, and $I_{N-1}^{HR}$ at N different camera locations. Similarly, a ground truth texture atlas T may be input to a differentiable renderer 403 to render ground truth images $I_0^{GT}$, $I_1^{GT}$, $I_2^{GT}$, and $I_{N-1}^{GT}$ at N different camera locations. $\mathcal{L}_{rendering}$ may then be back-propagated through the network via differentiable renderers 402 and 403. In this case, the loss function may be calculated based on Equation (8), below:

$$\mathcal{L}_{atlas}=\rho 0(\overline{T^{HR}},T) \quad (8)$$

where ρ0( . . . ) can also be $\| \ldots \|_p$ or any differentiable objective metric comparing two images.

Figure 5:
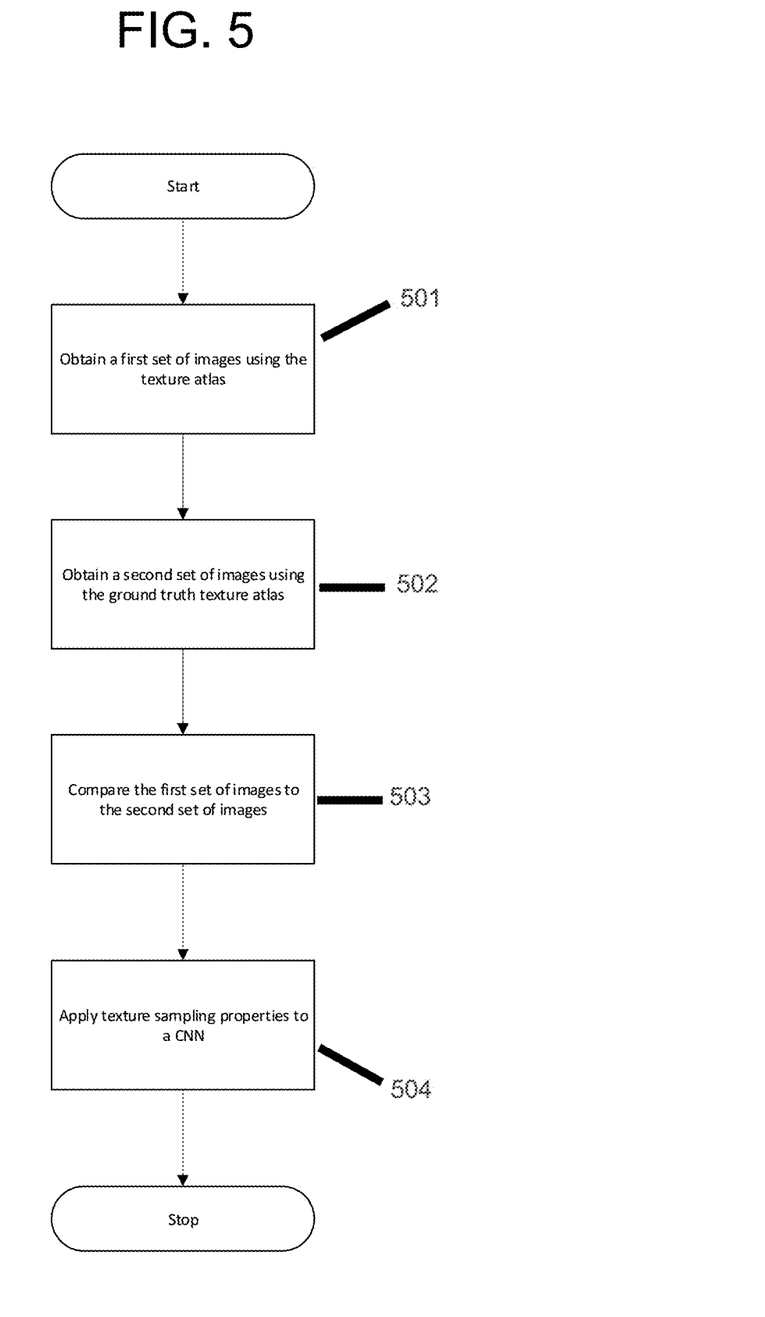
FIG. 5 is a flowchart illustrating a method of accounting for a rendering loss in a 3D model, according to one embodiment.

FIG. 5 is a flowchart illustrating a method of accounting for a rendering loss in a 3D model, according to one embodiment.

Referring to FIG. 5, in 501, a low resolution texture atlas $T^{LR}$ is rendered to obtain a first set of low resolution images $I_0^{LR}$, $I_1^{LR}$, $I_2^{LR}$, and $I_{N-1}^{LR}$. In 502, a ground truth texture atlas T is rendered to obtain a second set of ground truth images $I_0^{GT}$, $I_1^{GT}$, $I_2^{GT}$, and $I_{N-1}^{GT}$. In 503, the first set of low resolutions images $I_0^{LR}$, $I_1^{LR}$, $I_2^{LR}$, and $I_{N-1}^{LR}$ are compared to the second set of ground truth images $I_0^{GT}$, $I_1^{GT}$, $I_2^{GT}$, and $I_{N-1}^{GT}$ to determine a rendering loss. In 504, texture sampling properties are applied to a CNN to incorporate the rendering loss in a deep learning framework, and the CNN may be used to generate a textured 3D model when a texture atlas is input into the CNN. For example, after the texturing sampling properties are applied to the CNN, a low resolution texture atlas $T^{LR}$ may be provided as input into the CNN, and the CNN may perform super resolution processing to generate a high resolution texture atlas $T^{HR}$, which may be applied to a geometric mesh $\mathcal{M}$, to generate the texture of a 3D model. Accordingly, a 2D rendering loss may be used to account for properties of the 3D shape, such as positions of mesh vertices.

The CNN may be implemented by a deep learning framework, such as an enhanced deep super-resolution (EDSR) network. Upon executing the deep learning framework, a differentiable renderer may be used to account for rendering loss $\mathcal{L}_{rendering}$ in the framework.

Trained or untrained models may be used to account for the rendering loss $\mathcal{L}_{rendering}$. In the case of a trained model (i.e., a pretrained model), it may not be necessary to render the texture atlases T and $T^{LR}$ to obtain images $I_0^{LR}$, $I_1^{LR}$, $I_2^{LR}$, and $I_{N-1}^{LR}$ and images $I_0^{GT}$, $I_1^{GT}$, $I_2^{GT}$, and $I_{N-1}^{GT}$ because a total loss $\mathcal{L}$ may already be accounted for by the CNN. In this case, the network may perform super-resolution processing using the CNN, which is provided a 2D image (i.e., a texture atlas) as input to output a super-resolved image.

Figure 6:
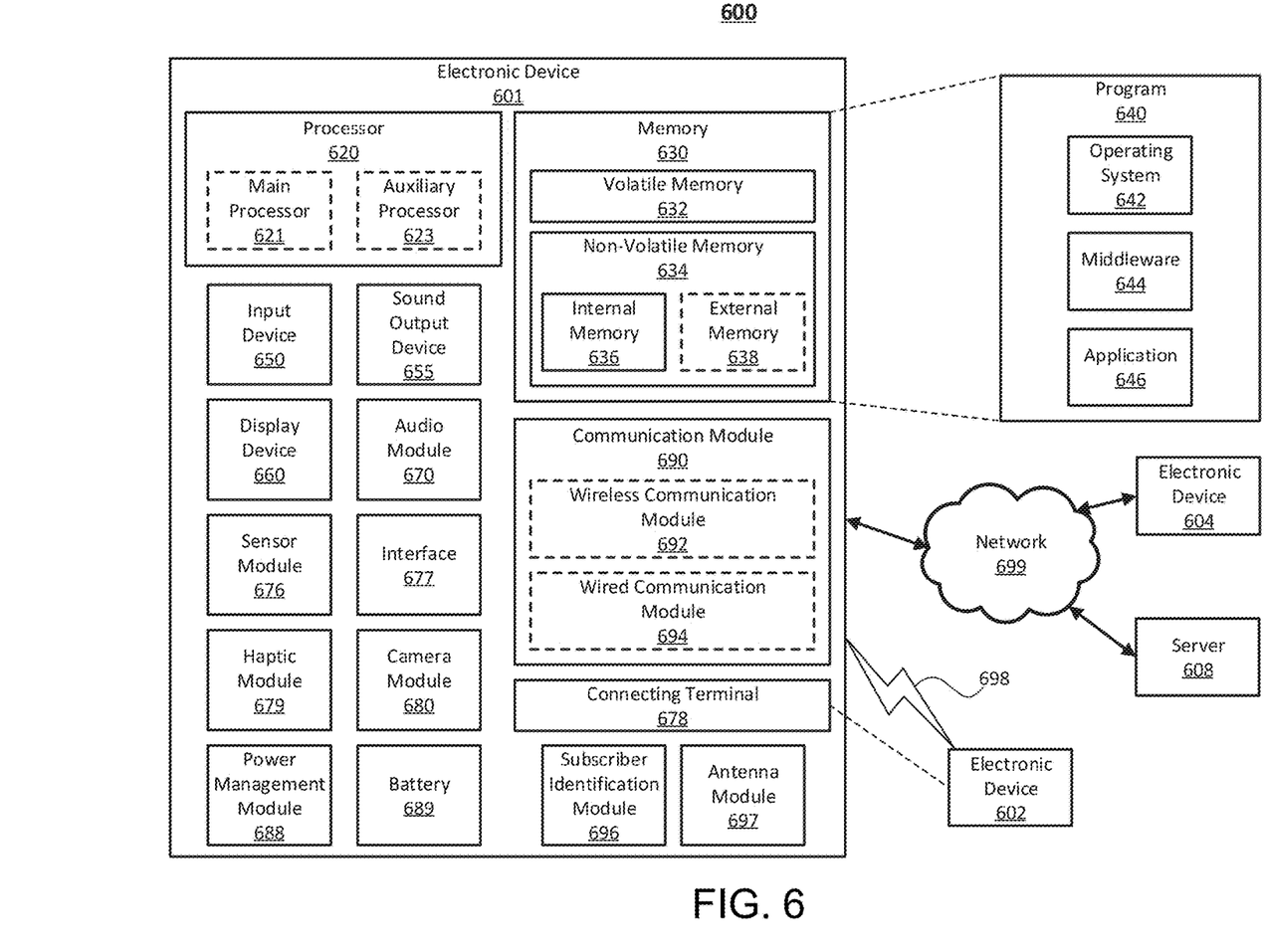
FIG. 6 is a block diagram of an electronic device in a network environment, according to one embodiment.

FIG. 6 is a block diagram of an electronic device 601 in a network environment 600, according to one embodiment.

Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of three dimensional (3D) texturing a 3D model, the method comprising:
   inputting a first texture atlas having a first resolution to a convolutional neural network (CNN) to obtain a second texture atlas having the first resolution that accounts for rendering loss;
   rendering the second texture atlas, via a first differentiable renderer, to obtain a first set of two dimensional (2D) images of the 3D model at different camera locations;
   rendering a ground truth texture atlas, via a second differentiable renderer, to obtain a second set of 2D ground truth images of the 3D model at the different camera locations;
   comparing an image from the first set of 2D images with a corresponding image from the second set of 2D ground truth images, for each of the different camera locations, to determine a rendering loss;
   back propagating the rendering loss, via the first and second differentiable renderers, to update parameters of the CNN for the 3D model and incorporate the rendering loss into a deep learning framework;
   inputting a 2D texture atlas having the first resolution into the CNN to apply super-resolution processing and generate a 3D model texture atlas having a second resolution that is higher than the first resolution; and applying the 3D model texture atlas to a geometric mesh to generate a texture of the 3D model.

2. The method of claim 1, wherein the rendering loss is determined based on at least one image included in the first set of 2D images at a first view and at least one image included in the second set of 2D ground truth images at the first view.

3. The method of claim 1, wherein the parameters of the CNN are selected based on an optimization scheme.

4. The method of claim 1, wherein texture sampling properties are applied to the CNN to account for the rendering loss while super-resolution processing is performed on a texture of the 3D model.

5. The method of claim 1,
wherein the CNN operates as a 2D image CNN model in response to the parameters of the CNN being predetermined.

6. An electronic device for texturing a three dimensional (3D) model, the electronic device comprising:
a non-transitory computer readable memory and a processor, wherein the processor, upon executing instructions stored in the non-transitory computer readable memory, is configured to:
input a first texture atlas having a first resolution to a convolutional neural network (CNN) to obtain a second texture atlas having the first resolution that accounts for rendering loss;
render the second texture atlas, via a first differentiable render, to obtain a first set of two dimensional (2D) images of the 3D model at different cameral locations;
render a ground truth texture atlas, via a second differentiable renderer, to obtain a second set of 2D ground truth images of the 3D model at the different camera locations;
compare an image from the first set of 2D images with a corresponding image from the second set of 2D ground truth images, for each of the different camera locations, to determine a rendering loss;
back propagate the rendering loss, via the first and second differentiable renderers, to update parameters of the CNN for the 3D model and incorporate the rendering loss into a deep learning framework;
input a 2D texture atlas having the first resolution into the CNN to apply super-resolution processing and generate a 3D model texture atlas having a second resolution that is higher than the first resolution; and
apply the 3D model texture atlas to a geometric mesh to generate a texture of the 3D model.

7. The electronic device of claim 6, wherein the rendering loss is determined based on at least one image included in the first set of 2D images at a first view and at least one image included in the second set of 2D ground truth images at the first view.

8. The electronic device of claim 6, wherein the parameters of the CNN are selected based on an optimization scheme.

9. The electronic device of claim 6, wherein texture sampling properties are applied to the CNN to account for the rendering loss while super-resolution processing is performed on the texture of the 3D model.

10. The electronic device of claim 6,
wherein the CNN operates as a 2D image CNN model in response to the parameters of the CNN being predetermined.

11. A method of three dimensional (3D) texturing a 3D model, the method comprising:
rendering a ground truth texture atlas, via a first differentiable renderer, to obtain a first set of two dimensional (2D) images of the 3D model;
down sampling the first set of 2D images of the 3D model to obtain a second set of 2D images of the 3D model;
texturing a geometric mesh of the 3D model to obtain a first texture atlas having a first resolution;
inputting the first texture atlas to a convolutional neural network (CNN) to obtain a second texture atlas having the first resolution that accounts for rendering loss;
rendering the second texture atlas, via a second differentiable renderer, to obtain a third set of 2D images of the 3D model;
determining a rendering loss by comparing a first image from the first set of 2D images with a corresponding image from the third set of 2D images for each view of the 3D model;
back propagating the rendering loss, via the first and second differentiable renderers, to update parameters of the CNN for the 3D model and incorporate the rendering loss into a deep learning framework;
inputting a 2D texture atlas having the first resolution into the CNN to apply super-resolution processing and generate a 3D model texture atlas having a second resolution that is higher than the first resolution; and
applying the 3D model texture atlas to a geometric mesh to generate a texture of the 3D model.

12. The method of claim 11, wherein the parameters of the CNN are selected based on an optimization scheme.

* * * * *